(12) United States Patent
Kato et al.

(10) Patent No.: US 6,213,455 B1
(45) Date of Patent: Apr. 10, 2001

(54) VIBRATION ISOLATOR

(75) Inventors: Kazuhiko Kato, Komaki; Tatsuya Suzuki, Kasugai, both of (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/268,724

(22) Filed: Mar. 17, 1999

(30) Foreign Application Priority Data

Mar. 23, 1998 (JP) .................................... 10-074235
Jan. 20, 1999 (JP) .................................... 11-012529

(51) Int. Cl.$^7$ ....................................... F16F 7/00
(52) U.S. Cl. ................. 267/141.2; 267/140.12; 267/293
(58) Field of Search ............... 267/140.3, 140.11, 267/140.12, 140.13, 140.4, 141, 141.2, 292, 293, 153, 136; 248/560, 638

(56) References Cited

U.S. PATENT DOCUMENTS

| | | | | |
|---|---|---|---|---|
| 5,076,725 | * | 12/1991 | Nakaura ............................ | 267/141.2 |
| 5,190,269 | * | 3/1993 | Ikeda et al. ...................... | 267/140.12 |
| 5,320,332 | * | 6/1994 | Hamaekers ........................ | 267/140.12 |
| 5,551,661 | * | 9/1996 | Bunker ............................. | 267/140.12 |
| 5,890,704 | * | 4/1999 | Tsutsumida ....................... | 267/140.12 |
| 6,068,247 | * | 5/2000 | Rudolph ........................... | 267/140.12 |

* cited by examiner

Primary Examiner—Matthew C. Graham
Assistant Examiner—Mariano Sy
(74) Attorney, Agent, or Firm—Oblon, Spivak, McClelland, Maier & Neustadt, P.C.

(57) ABSTRACT

A vibration isolator which can attain both a reduction in the vibration transmitting power and superior durability of an elastic stopper which has a compact stopper structure. This vibration isolator comprises an inner member; a mounting member having a tubular portion which is disposed outside of and at a distance from the inner member approximately coaxially with the inner member; a rubber elastic body disposed between and connecting integrally the inner member and the tubular member and having an axially through cavity portion; and an elastic stopper projecting from an inner circumferential surface of the tubular portion in a manner to face the inner member by way of the cavity portion. This tubular portion has side stoppers which are disposed at both the axial ends of a portion where the elastic stopper is formed, in a manner to face the inner member, and which form therebetween a concave portion depressed in a radially outward direction. The elastic stopper has a projection base portion embedded in the concave portion and projecting in a radially outward direction from fore end surfaces of the side stoppers.

9 Claims, 8 Drawing Sheets

VIBRATION ISOLATOR

BACKGROUND OF THE INVENTION

1. Field of the Invention

The present invention relates to a vibration isolator used suitably as, for example, an engine mount which vibroisolatingly supports an engine unit to be mounted on a vehicle.

2. Description of the Related Art

Conventionally, when an engine unit is mounted on a vehicle, such a vibration isolator as an engine mount is employed to support the engine unit vibroisolatingly, in order to suppress vibrations generated at the engine unit from being transmitted to a car body. An example of the conventional engine mount of this type is shown in FIGS. 11 to 13.

This engine mount comprises a cylindrical inner member 5; a mounting member 6 having a tubular portion 61 which is disposed outside of and at a distance from the inner member 5 approximately coaxially with the inner member 5, and two mounting seat portions 62, 63 which are integrally formed at an outer periphery of the tubular portion 61; a rubber elastic body 7 disposed between and connecting integrally the inner member 5 and the tubular portion 61, and having axially through cavity portions 71, 72; and an elastic stopper 8 projecting from an inner circumferential surface of the tubular portion 61 in a manner to face the inner member 5 by way of one cavity portion 71. At a portion of the tubular portion 61 where the elastic stopper 8 is formed, there are side stoppers 65, 65 extending in axially opposite directions and having the same thickness as the tubular portion 61. On the surface of each of the side stoppers 65, 65, there is disposed a thin portion 85 of the elastic stopper 8.

This engine mount is secured by fixing one of the inner member 5 and the mounting member 6 to an engine unit and fixing the other to a car body. In this case, the elastic stopper 8 is placed so as to stand in a main vibration input direction, and fore ends of brackets 55, 55 which are connected to both the ends of the inner member 5 are provided so as to face the side stoppers 65, 65.

When vibrations are input from the engine unit to the engine mount, the rubber elastic body 7 disposed between the inner member 5 and the tubular portion 61 of the mounting member 6 is deformed elastically, thereby damping the vibrations effectively. When relatively weak vibrations are input, the elastic stopper 8 is compressed by the inner member and the tubular portion 61, whereby relative displacement of the inner member 5 and the mounting member 6 is restricted elastically and vibration transmitting power is reduced effectively.

When strong vibrations are input, the fore ends of the brackets 55, 55 which are connected to both the ends of the inner member 5 come in contact with the thin portions 85, 85 of the elastic stopper 8 which are placed on the side stoppers 65, 65. Thus, excessive relative displacement of the inner member 5 and the mounting member 6 is restricted, and the rubber elastic body 7 and the elastic stopper 8 are prevented from being excessively deformed, so superior durability is secured.

By the way, the above conventional engine mount uses the brackets 55, 55 which are connected to both the ends of the inner member 5, and the side stoppers 65, 65 which extend in the axially opposite directions from the tubular portion 61 of the mounting member 6, as a stopper structure for restricting excessive relative displacement of the inner member 5 and the mounting member 6 when strong vibrations are input.

Because the side stoppers 65, 65 project axially, the tubular portion 61 of the mounting member 6 is increased in size. Besides, since the shape and size of the side stoppers 65, 65 must be determined in accordance with the shape and size of the brackets 55, 55 connected to the inner member 5, a lot of limitations are imposed on the design and the stopper structure becomes complicated.

SUMMARY OF THE INVENTION

The present invention has been conceived to dissolve these inconveniences.

It is an object of the present invention to provide a vibration isolator which achieves both a reduction in the vibration transmitting power and superior durability of an elastic stopper.

It is another object of the present invention to provide a vibration isolator which has a compact stopper structure.

A vibration isolator according to the first aspect of the present invention, which dissolves the above inconveniences, comprises: an inner member; a mounting member having a tubular portion which is disposed outside of and at a distance from the inner member approximately coaxially with the inner member; a rubber elastic body disposed between and connecting integrally the inner member and the tubular portion, and having an axially through cavity portion; and an elastic stopper projecting from an inner circumferential surface of the tubular portion in a manner to face the inner member by way of the cavity portion, wherein the tubular portion has side stoppers which are disposed at both the axial ends of a portion where the elastic stopper is formed, in a manner to face the inner member, and which form therebetween a concave portion depressed in a radially outward direction; and the elastic stopper has a projection base portion which is embedded in the concave portion and which projects in a radially outward direction from fore end surfaces of the side stoppers.

According to the first aspect of the present invention, since the side stoppers for restricting excessive relative displacement of the inner member and the mounting member are disposed at both the axial ends of a portion of the tubular portion where the elastic stopper is formed, in a manner to face the inner member, the vibration isolator can have a compact shape in which the tubular portion doesn't protrude axially. In addition, since the elastic stopper for restricting elastically the relative displacement of the inner member and the mounting member is arranged in such a way that the projection base portion is embedded in the concave portion formed between both the side stoppers. Owing to this projection base portion, the elastic stopper can attain a sufficiently large thickness (volume) and, as a result, the vibration transmitting power can be decreased effectively.

Thus, according to the first aspect of the present invention, the vibration isolator can attain both a reduction in the vibration transmitting power and superior durability of the elastic stopper, and can have a compact stopper structure.

In the present invention, the side stoppers provided at the tubular portion of the mounting member are constituted by rigid bodies having an appropriate strength, and, for example, can be formed of metal, synthetic resin, or the like integrally with the tubular portion.

A vibration isolator according to the second aspect of the present invention has a construction wherein, in the first aspect of the present invention, the mounting member is formed of synthetic resin.

According to this aspect of the present invention, since the mounting member including the tubular portion and the side stoppers is formed of a lightweight synthetic resin, the mounting member can be sufficiently reduced in weight. A polyamide resin, for example, 6,6-nylon can be suitably employed as a synthetic resin in view of strength. This synthetic resin may be improved in strength by being filled with such a reinforcing fiber as glass fiber.

A vibration isolator according to the third aspect of the present invention has a construction wherein, in the second aspect of the present invention, the mounting member is formed by placing at least the elastic stopper in a molding die and carrying out injection molding, and the side stoppers are formed of synthetic resin integrally with the tubular portion.

According to this aspect of the present invention, since the elastic stopper is disposed between the side stoppers which are to be axially arranged in the molding die, the direction of removing the molding die can be set as an axial direction. Thus, the side stoppers can be integrally formed of synthetic resin without causing a problem with the direction of removing the molding die.

A vibration isolator according to the fourth aspect of the present invention has a construction wherein, in any of the first to third aspects of the present invention, the elastic stopper has elastic skin layers extending axially and covering fore end surfaces of the side stoppers respectively.

According to this aspect of the present invention, since the fore end surfaces of the side stoppers are covered with the elastic skin layers, an impact which generates in restricting excessive relative displacement of the inner member and the mounting member can be buffered.

BRIEF DESCRIPTION OF THE DRAWINGS

Other objects and features of the invention will become apparent to those skilled in the art as the disclosure is made in the following description of preferred embodiments of the present invention, as illustrated in the accompanying sheets of drawings, in which.

PREFERRED EMBODIMENTS OF THE PRESENT INVENTION

Hereinafter, preferred embodiments of the present invention will be described with reference to the annexed drawings.

The First Preferred Embodiment

Figure 1:
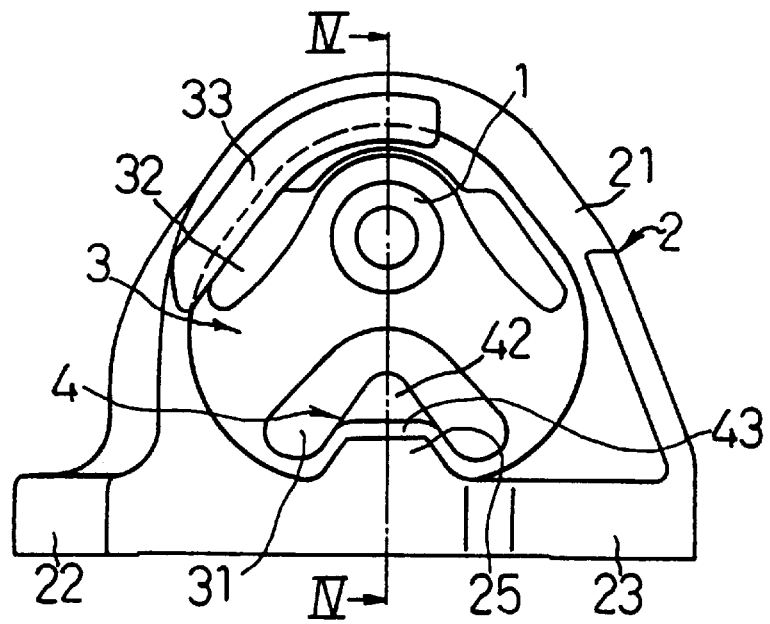
FIG. 1 is a front view of a vibration isolator according to a first preferred embodiment of the present invention.
Figure 2:
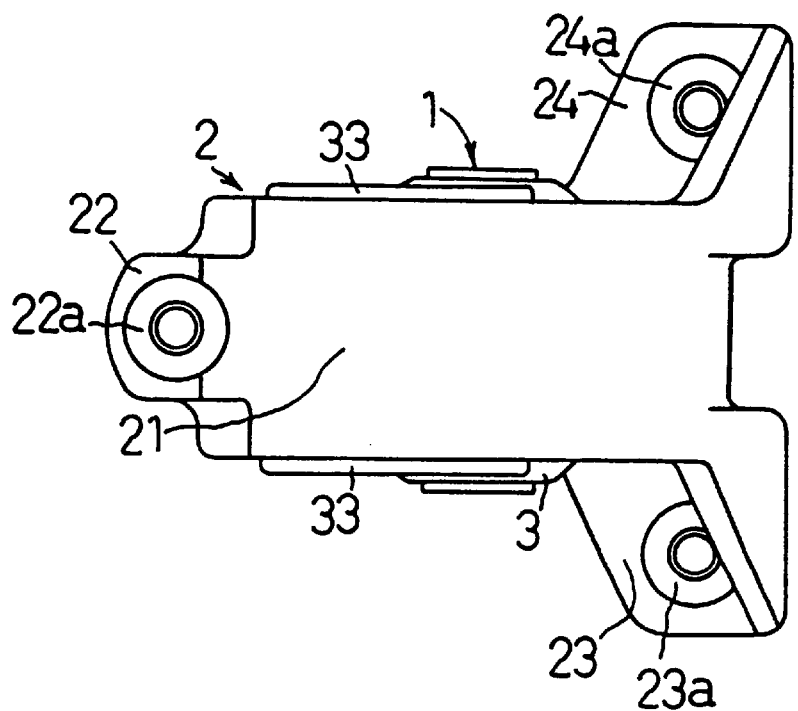
FIG. 2 is a plan view of the vibration isolator according to the first preferred embodiment of the present invention.
Figure 3:
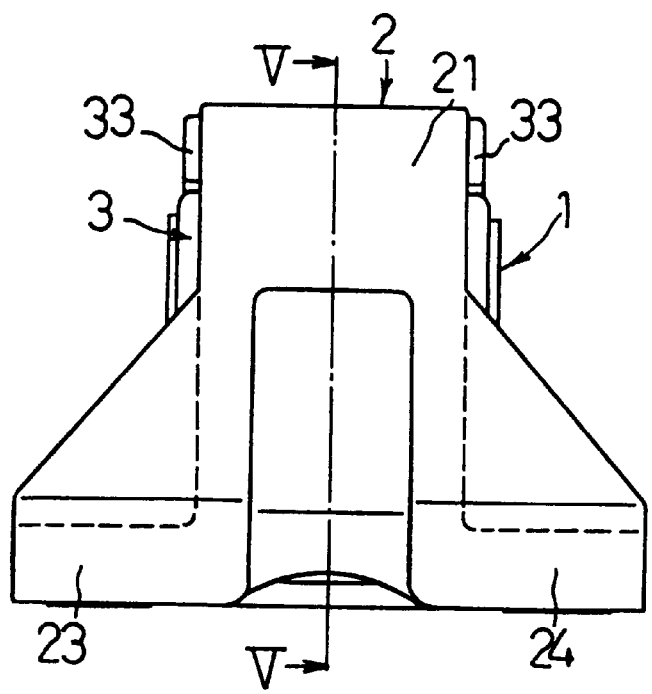
FIG. 3 is a side view of the vibration isolator according to the first preferred embodiment of the present invention.
Figure 4:
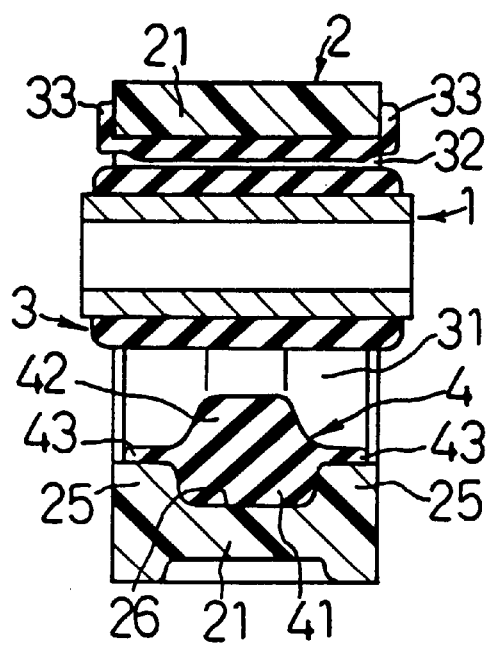
FIG. 4 is a cross sectional view taken along line IV—IV of FIG. 1.
Figure 5:
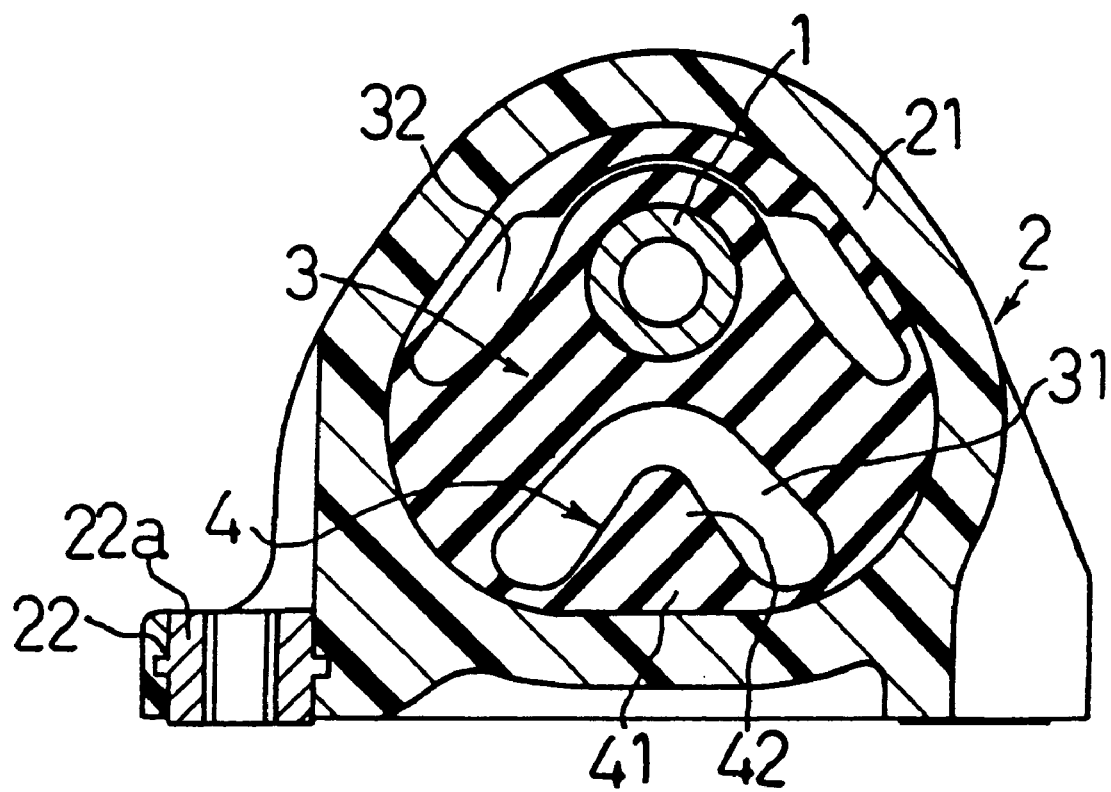
FIG. 5 is a cross sectional view taken along line V—V of FIG. 3.

FIG. 1 is a front view of a vibration isolator of the first preferred embodiment of the present invention. FIG. 2 is a plan view of this vibration isolator. FIG. 3 is a side view of this vibration isolator. FIG. 4 is a cross sectional view taken along line IV—IV of FIG. 1. FIG. 5 is a cross sectional view taken along line V—V of FIG. 3.

The vibration isolator of this preferred embodiment mainly comprises, as shown in FIGS. 1 to 5, an inner member 1; a mounting member 2 formed of synthetic resin and having a tubular portion 21 which is disposed outside of and at a distance from the inner member 1 approximately coaxially with the inner member 1; a rubber elastic body 3 disposed between and connecting integrally the inner member 1 and the tubular portion 21, and having axially through cavity portions 31, 32; and an elastic stopper 4 projecting from an inner circumferential surface of the tubular portion 21 in a manner to face the inner member 1 by way of one cavity portion 31.

The inner member 1 is made of such a metal as steel and has the shape of a pipe having a bore into which an attaching bolt or the like is inserted.

The mounting member 2 comprises the tubular portion 21 having a pair of side stoppers 25, 25; and three mounting seat portions 22 to 24 projecting outward from an outer periphery of the tubular portion 21 and each having a mounting seat surface which lies in the same plane. The tubular portion 21 is formed approximately in the shape of a cylinder having a larger inner circumference than an outer circumference of the inner member 1 by a predetermined length and having a slightly smaller axial length than the inner member 1.

In a predetermined position (the position in the main vibration input direction) of the inner circumferential surface of the tubular portion 21, there are a pair of side stoppers 25, 25 projecting from both the axial ends of the tubular portion 21 in a manner to face the inner member 1, and forming therebetween a concave portion 26 which is depressed in a radially outward direction. The height of the projections of these side stoppers 25, 25 is appropriately determined in consideration of the distance between the fore end surfaces of the side stoppers 25, 25 and the outer circumferential surface of the inner member 1. Nuts 22a to 24a which are to be screwed down on attaching bolts are respectively embedded in the mounting seat portions 22 to 24.

This mounting member 2 is formed by injection molding 6,6-nylon reinforced with 40 to 50% by weight of glass fiber. Before the mounting member 2 is formed by injection molding, the aforementioned inner member 1, and the rubber elastic body 3 and the elastic stopper 4 mentioned later are placed in a molding die, so that those are integrally connected to the mounting member 2 in predetermined positions. At this time, since the elastic stopper 4 is placed between axially arranged portions where the pair of side stoppers 25, 25 are to be formed, the direction of removing the molding die can be set as an axial direction. Thus, formation of the side stoppers 25, 25 does not cause a problem with the direction of removing the molding die.

The rubber elastic body 3 is formed by placing the inner member 1 in a vulcanization molding die and vulcanization molding a rubber material. So, the rubber elastic body 3 adheres by vulcanization to the outer circumferential surface of the inner member 1 and is formed approximately in an annular shape. The outer circumferential surface of this rubber elastic body 3 is made to adhere to the inner circumferential surface of the tubular portion 21, when the mounting member 2 is formed by injection molding. Thus, the rubber elastic body 3 is disposed between and connects integrally the inner member 1 and the tubular portion 21. In the rubber elastic body 3 on both the sides of portions sandwiching the inner member 1 in the main vibration input direction, there are axially through cavity portions 31, 32 for determining an appropriate spring constant of the rubber elastic body 3. This rubber elastic body 3 is integrally provided with rubber buffer portions 33, 33 which adhere to both the end surfaces of the tubular portion 21 and buffer an impact which one end surface of the tubular portion 21 has against a mating member thereof.

The elastic stopper 4 is integrally formed of the same rubber material as the rubber elastic body 3. A part of the elastic stopper 4 is embedded in a concave portion 26 which is formed between the pair of side stoppers 25, 25 of the tubular portion 21. This elastic stopper 4 comprises a projection base portion 41 which is embedded in the concave portion 26 of the tubular portion 21 and projects in a radially outward direction from fore end surfaces of the side stoppers 25, 25; a projection head portion 42 protruding from the projection base portion 41 in a manner to face the inner member 1 by way of the cavity portion 31; and elastic skin layers 43, 43 extending in axially opposite directions from the projection head portion 42 and covering respectively the fore end surfaces of the side stoppers 25, 25. Since this elastic stopper 4 projects from the side of the tubular portion 21 in a manner to face the inner member 1, and both the circumferential ends of the projection base portion 41 are connected to the rubber elastic body 3, the cavity portion 31 is formed approximately in the shape of a reverse V.

The vibration isolator of this preferred embodiment having the above-mentioned construction is used as an engine mount which vibroisolatingly supports an engine unit to be mounted on a vehicle. This vibration isolator is secured by fixing, for example, the inner member 1 to an engine unit with an attaching bolt and a nut or the like on one hand, and by fixing the mounting seat portions 22–24 of the mounting member 2 to a car body with attaching bolts, etc. on the other hand, so that the elastic stopper 4 is placed so as to stand in a main vibration input direction.

When vibrations are input from the engine unit to the vibration isolator, the rubber elastic body 3 disposed between the inner member 1 and the tubular portion 21 of the mounting member 2 is deformed elastically, thereby damping the vibrations effectively. When relatively weak vibrations are input, the elastic stopper 4 is compressed by the inner member 1 and the tubular portion 21, and relative displacement of the inner member 1 and the mounting member 2 is elastically restricted, whereby the vibration transmitting power is decreased effectively.

In the meantime, when strong vibrations are input, after the elastic stopper 4 is compressed as mentioned above, excessive relative displacement of the inner member 1 and the mounting member 2 is restricted by the inner member 1 and both the side stoppers 25, 25. Thus, the rubber elastic body 3 and the elastic stopper 4 are prevented from being excessively deformed, so this vibration isolator can secure superior durability.

As mentioned above, the vibration isolator of this preferred embodiment can have a compact shape in which the tubular portion 21 doesn't protrude axially, since the side stoppers 25, 25 for restricting excessive relative displacement of the inner member 1 and the mounting member 2 are disposed at both the axial ends of a portion of the tubular portion 21 so as to project in a manner to face the inner member 1.

The elastic stopper 4 for restricting elastically relative displacement of the inner member 1 and the mounting member 2 is arranged in such a way that the projection base portion 41 is embedded in the concave portion 26 which is formed by both the side stoppers 25, 25. Owing to this projection base portion 41, the elastic stopper 4 can attain a sufficiently large thickness (volume), and, as a result, vibration transmitting power can be reduced effectively.

Therefore, the vibration isolator of this preferred embodiment can attain both a reduction in the vibration transmitting power and superior durability of the elastic stopper 4, and can have a compact stopper structure.

Further, the mounting member 2 of this preferred embodiment can be reduced in weight sufficiently, because almost all parts thereof are formed of a lightweight synthetic resin. Besides, when this mounting member 2 is formed by placing the elastic stopper 4 in a molding die and carrying out injection molding, the elastic stopper 4 is placed between the side stoppers 25, 25 which are to be axially arranged in the molding die, and the direction of removing the molding die is set as an axial direction. So, the side stoppers 25, 25 can be formed of synthetic resin integrally with the tubular portion 21 without causing a problem with the direction of removing the molding die.

Furthermore, since the elastic stopper 4 of this preferred embodiment has the elastic skin layers 43, 43 extending axially from the projection head portion 42 and covering the fore end surfaces of the side stoppers 25, 25 respectively, an impact which generates in restricting excessive relative displacement of the inner member 1 and the mounting member 2 can be buffered.

The Second Preferred Embodiment

Figure 6:
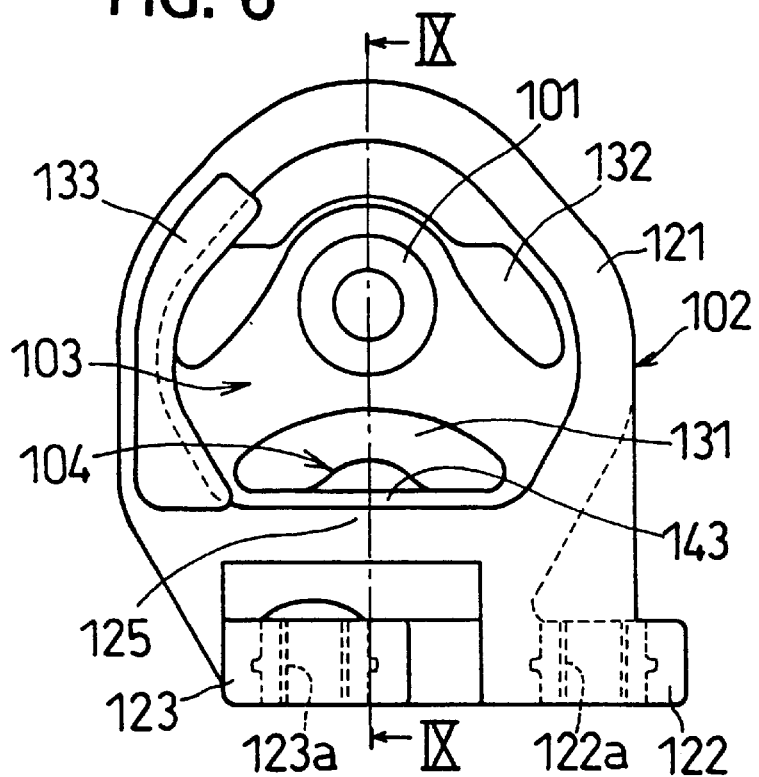
FIG. 6 is a front view of a vibration isolator according to a second preferred embodiment of the present invention.
Figure 7:
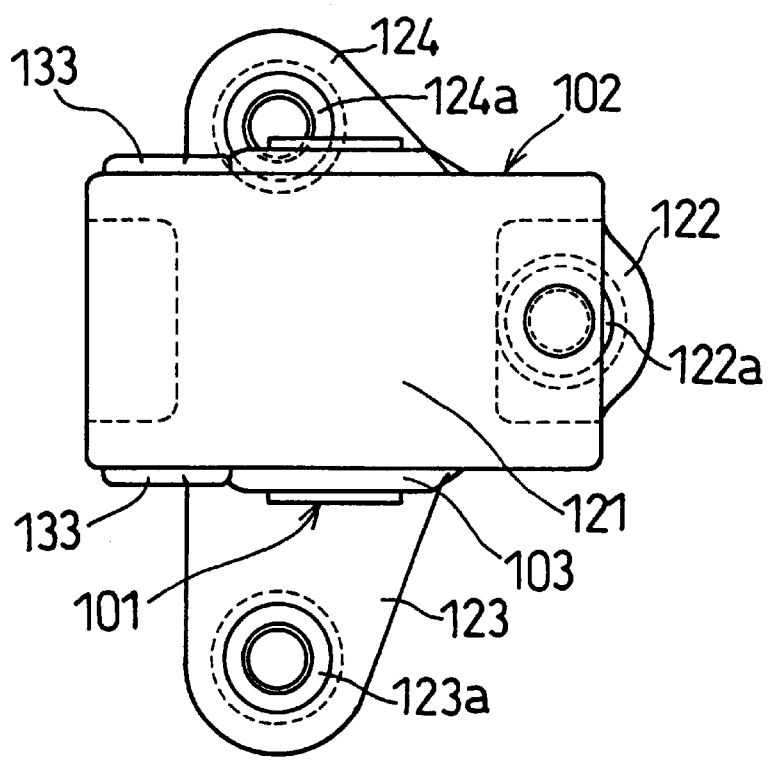
FIG. 7 is a plan view of the vibration isolator according to the second preferred embodiment of the present invention.
Figure 8:
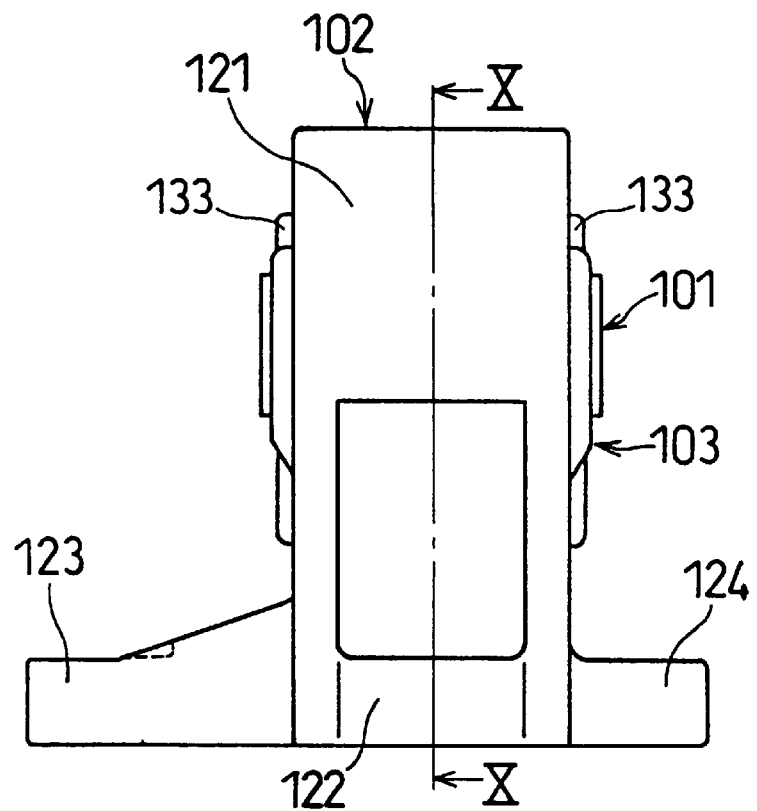
FIG. 8 is a side view of the vibration isolator according to the second preferred embodiment of the present invention.
Figure 9:
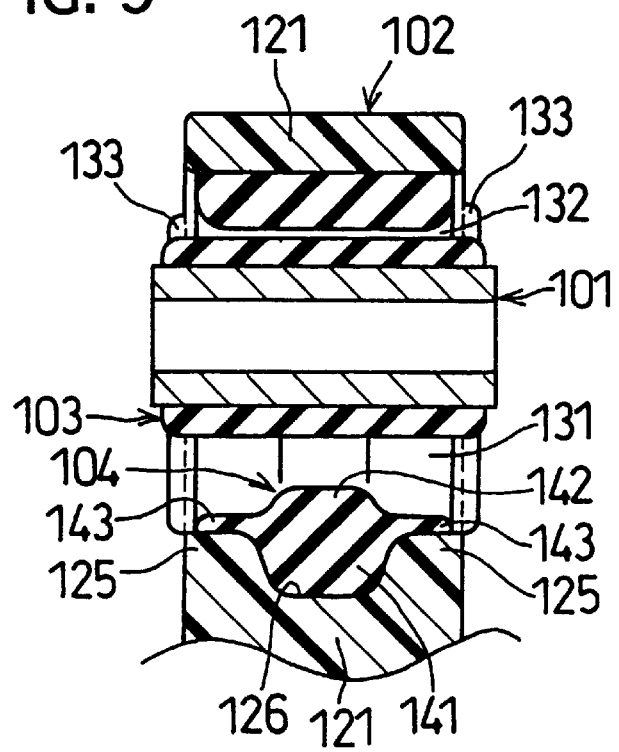
FIG. 9 is a cross sectional view taken along line IX—IX of FIG. 6.
Figure 10:
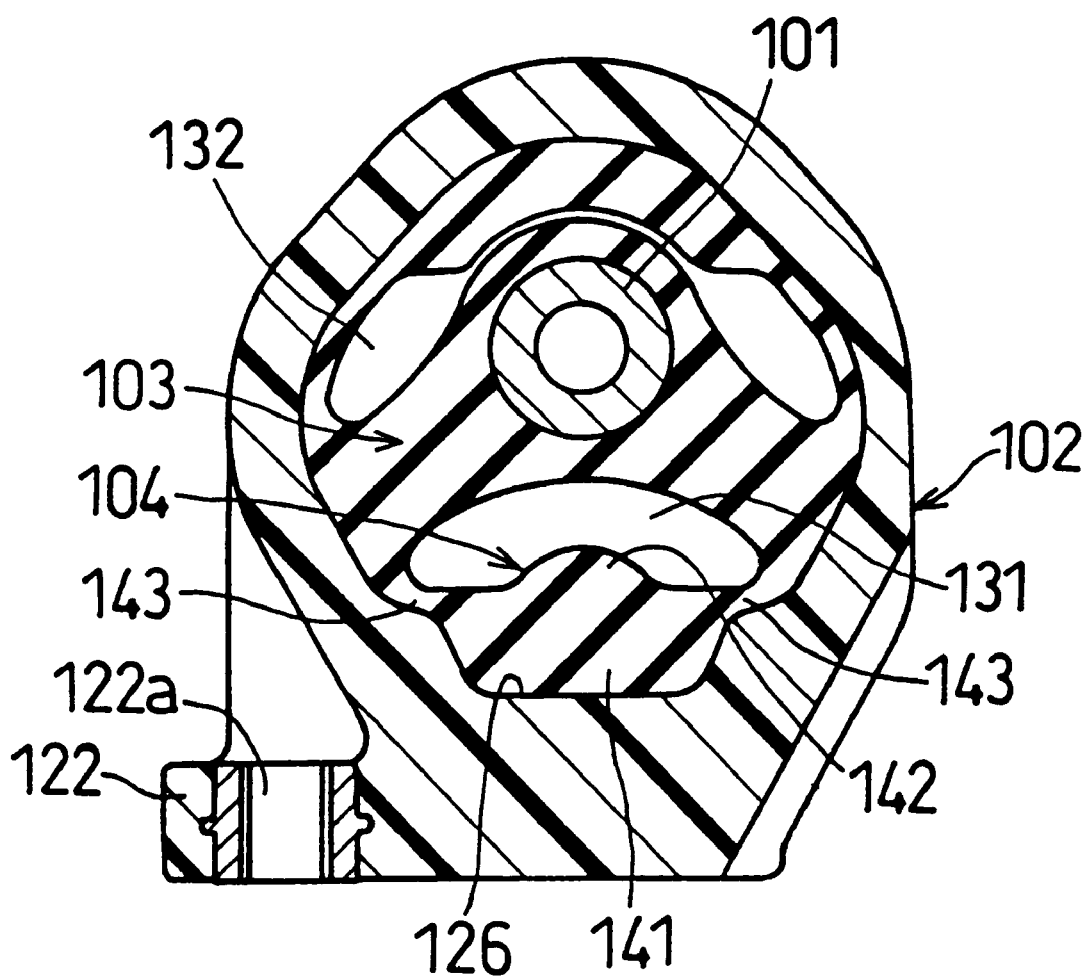
FIG. 10 is a cross sectional view taken along line X—X of FIG. 8.
Figure 11:
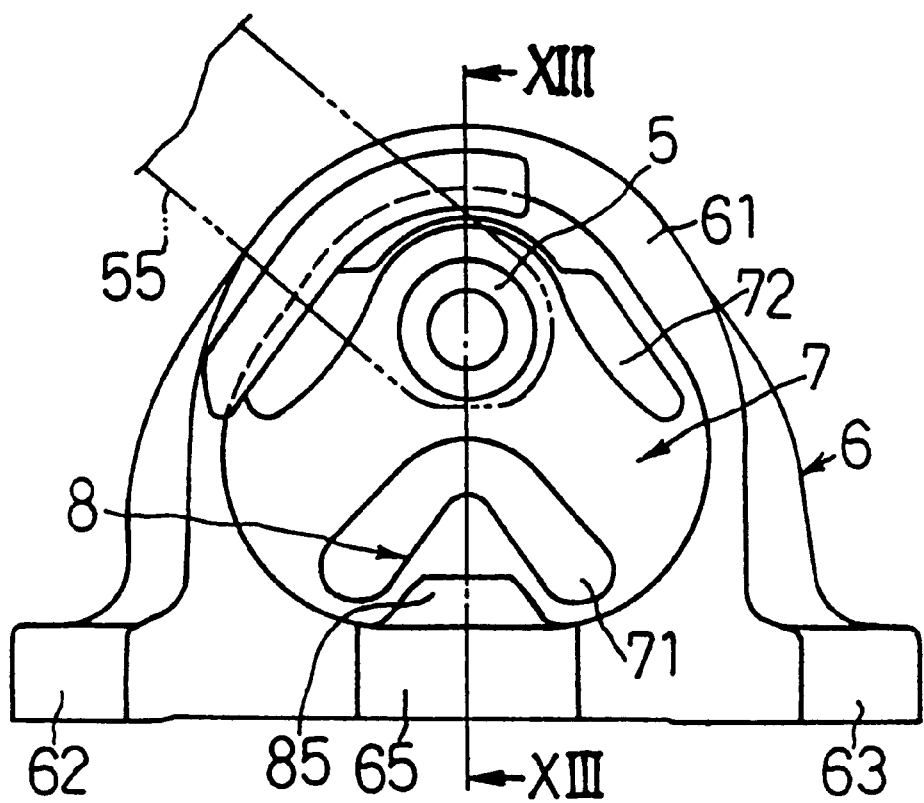
FIG. 11 is a front view of the conventional vibration isolator.
Figure 12:
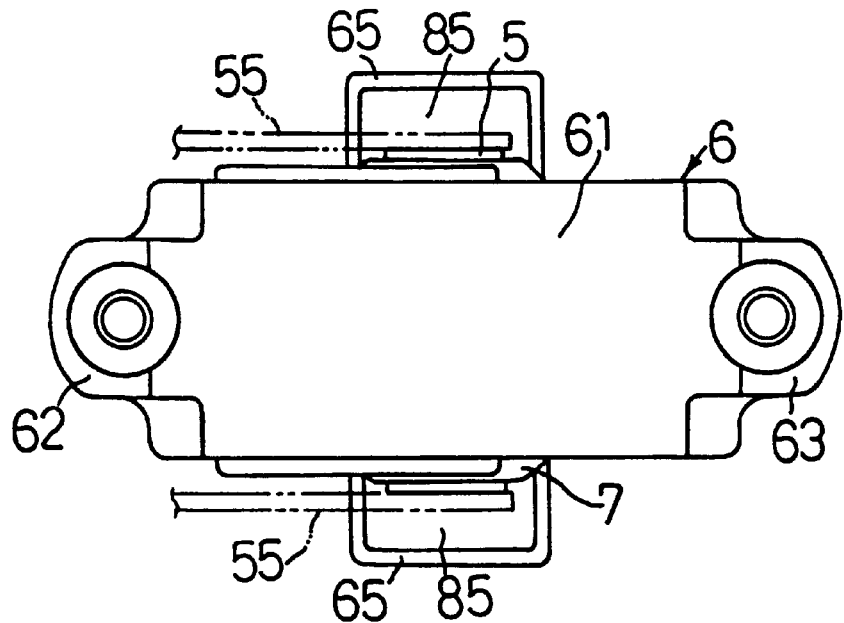
FIG. 12 is a plan view of the conventional vibration isolator.
Figure 13:
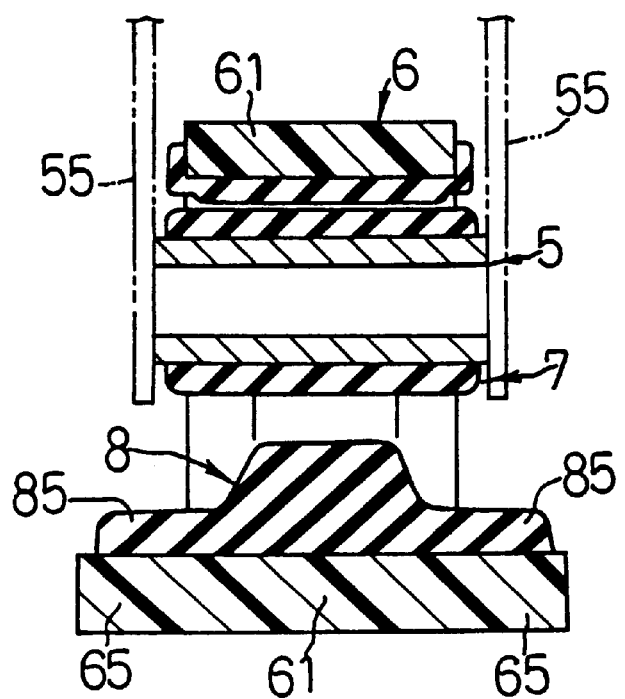
FIG. 13 is a cross sectional view taken along XIII—XIII of FIG 1.

FIG. 6 is a front view of the vibration isolator of the second preferred embodiment of the present invention. FIG. 7 is a plan view of this vibration isolator. FIG. 8 is a side view of that vibration isolator. FIG. 9 is a cross sectional view taken along line IX—IX of FIG. 6. FIG. 10 is a cross sectional view taken along line X—X of FIG. 8.

The vibration isolator of this preferred embodiment mainly comprises, as shown in FIGS. 6 to 10, an inner member 101 formed of such a metal as steel in the shape of a pipe; a mounting member 102 formed of synthetic resin and having a tubular portion 121 which is disposed outside of and at a distance from the inner member 101 approximately coaxially with the inner member 101; a rubber elastic body 103 disposed between and connecting integrally the inner member 101 and the tubular portion 121, and having axially through cavity portions 131, 132; and an elastic stopper 104 projecting from an inner circumferential surface of the tubular potion 121 in a manner to face the inner member 101 by way of one cavity portion 131.

This vibration isolator has basically the same construction as that of the first preferred embodiment except the shapes of the concave portion 126 provided in the tubular portion 121 of the mounting member 102, the rubber elastic body 103 and the elastic stopper 104.

The mounting member 102 comprises the tubular portion 121 having a pair of side stoppers 125, 125, and three mounting seat portions 122 to 124 projecting outward from an outer periphery of the tubular portion 121 and each having a mounting seat surface which lies in the same plane. In a predetermined position (the position in the main vibration input direction) of the inner circumferential surface of the tubular portion 121, there is a flat plane, and at a center portion of that flat plane there is a concave portion 126 depressed in a radially outward direction. Thus, flat plane portions at both the axial ends of the concave portion 126 constitute one pair of side stoppers 125, 125 which respectively face the ends of the inner member 101. Since flat planes which are even with the side stoppers 125, 125 are also formed at both the circumferential sides of the concave portion 126, the circumferential length of each of the side stoppers 125, 125 is substantially larger than that of the first preferred embodiment.

Since the respective mounting seat portions 122–124 are provided in adjustment with the position of a mating member to which these portions 122–124 are fixed, their position and shape is slightly different from that of the first preferred embodiment. In the mounting seat portions 122–124, nuts 122*a*–124*a* are respectively embedded in the same manner as in the first preferred embodiment.

This mounting member 102 is formed by injection molding the same resin molding material as that of the first preferred embodiment in the same manner as in the first preferred embodiment. That is to say, by placing at least the elastic stopper 104 in a molding die and then molding the mounting member 102, the side stoppers 125, 125 are integrally formed of resin without causing a problem with the direction of removing the molding die.

The rubber elastic body 103 is formed approximately in an annular shape in the same manner as the rubber elastic body 3 of the first preferred embodiment, and is disposed between and connects integrally the inner member 101 and the tubular portion 121. In the rubber elastic body 103, on both the sides of portions sandwiching the inner member 1 in the main vibration input direction, there are axially through cavity portions 131, 132. This rubber elastic body 103 integrally has belt-shaped rubber buffer portions 133, 133 which adhere to both the end surfaces of the tubular portion 121, but their arrangement is slightly different from that of the first preferred embodiment.

The elastic stopper 104 is integrally formed of the same rubber material as the rubber elastic body 103 in the same manner as in the first preferred embodiment, and a part of the elastic stopper 104 is embedded in the concave portion 126 of the tubular portion 121. This elastic stopper 104 comprises a projection base portion 141 embedded in the concave portion 126 of the tubular portion 121 and projecting in a radially outward direction from the fore end surface of the side stoppers 125, 125; a projection head portion 142 projecting from the projection base portion 141 in a manner to face the inner member 101 by way of the cavity portion 131; and elastic skin layers 143, 143 extending in all the radial directions from the projection head portion 142 and covering the fore end surfaces of the side stoppers 125, 125, respectively.

Since this elastic stopper 104 projects from the side of the tubular portion 121 in a manner to face the inner member 101, and both the circumferential ends of the elastic skin layers 143, 143 are connected to the rubber elastic body 103, the cavity portion 131 approximately has the shape of an arc. The projection base portion 141 of this elastic stopper 104 has a larger circumferential length and accordingly a larger volume than the projection base portion 41 of the first preferred embodiment, since the concave portion 126 has a larger circumferential length than the concave portion 26 of the first preferred embodiment.

The vibration isolator of this preferred embodiment having the above construction is used as an engine mount which vibroisolatingly supports an engine unit to be mounted on a vehicle after being secured in the same way as that of the first preferred embodiment, and exhibits similar functions and effects to those of the first preferred embodiment. That is to say, the vibration isolator of this preferred embodiment achieves both a reduction in the vibration transmitting power and superior durability of the elastic stopper 104, and can have a compact stopper structure.

Besides, the side stoppers 125, 125 of this preferred embodiment can function as stoppers even when vibrations are input in a direction slightly different from the main vibration input direction, since flat planes which are even with the side stoppers 125, 125 are formed at both the circumferential ends of the concave portion 126 and so the side stoppers 125, 125 have a larger circumferential length. Thus, the side stoppers 125, 125 of this preferred embodiment can exhibit a stopper function against vibrations input in a wider range of directions when compared to those of the first preferred embodiment.

In addition, the elastic stopper 104 of this preferred embodiment is advantageous in reducing the vibration transmitting power more effectively, because the volume of the projection base portion 141 embedded in the concave portion 126 is larger than that of the projection base portion 41 of the first preferred embodiment.

Obviously, many modifications and variations of the present invention are possible in the light of the above teachings. It is therefore to be understood that within the scope of the appended claims, the invention may be practiced otherwise than as specifically described.

What is claimed is:

1. A vibration isolator, comprising:

an inner member;

a mounting member having a tubular portion which is disposed outside of and at a distance from said inner member approximately coaxially with said inner member;

a rubber elastic body disposed between and integrally connecting said inner member and said tubular portion, and having an axially through cavity portion;

an elastic stopper projecting from an inner circumferential surface of said tubular portion in a manner to face said inner member by way of said cavity portion;

wherein said tubular portion has side stoppers which are disposed at both the axial ends of a portion where said elastic stopper is formed, in a manner to face said inner member, and which form therebetween a concave portion depressed in a radially outward direction, and said elastic stopper having a projection base portion which is embedded in said concave portion and which projects in a radially outward direction from fore end surfaces of said side stoppers; and wherein said elastic stopper functions to stop vibration inputted in a direction in which said tubular portion of said mounting member faces said inner member in said radially outward direction.

2. A vibration isolator according to claim 1, wherein said mounting member is formed of synthetic resin.

3. A vibration isolator according to claim 2, wherein said mounting member is formed by placing at least said elastic stopper in a molding die and carrying out injection molding, and said side stoppers are formed of synthetic resin integrally with said tubular portion.

4. A vibration isolator according to claim 1, wherein said elastic stopper has elastic skin layers extending axially and covering fore end surfaces of said side stoppers.

5. The vibration isolator according to claim 2, wherein said elastic stopper has elastic skin layers extending axially and covering fore end surfaces of said side stoppers.

6. The vibration isolator according to claim 3, wherein said elastic stopper has elastic skin layers extending axially and covering fore end surfaces of said side stoppers.

7. A vibration isolator, comprising:

an inner member;

a mounting member having a tubular portion which is disposed outside of and at a distance from said inner member approximately coaxially with said inner member;

a rubber elastic body disposed between and integrally connecting said inner member and said tubular portion, and having an axially through cavity portion; and an elastic stopper projecting from an inner circumferential surface of said tubular portion in a manner to face said inner member by way of said cavity portion, wherein said tubular portion has side stoppers which are disposed at both the axial ends of a portion where said elastic stopper is formed, in a manner to face said inner member, and which form therebetween a concave portion depressed in a radially outward direction, said elastic stopper having a projection base portion which is embedded in said concave portion and which projects in a radially outward direction from fore end surfaces of said side stoppers, and said elastic stopper having elastic skin layers extending axially and covering said fore end surfaces of said side stoppers, respectively.

8. The vibration isolator according to claim 7, wherein said mounting member is formed of synthetic resin.

9. The vibration isolator according to claim 8, wherein said mounting member is formed by placing at least said elastic stopper in a molding die and carrying out injection molding, and said side stoppers are formed of synthetic resin integrally with said tubular portion.

* * * * *